United States Patent
Gargano

[11] Patent Number: 5,881,894
[45] Date of Patent: Mar. 16, 1999

[54] COMBINATION BOTTLE CAP AND PRE-MEASURED MEDICINE DISPENSER

[76] Inventor: Cathy Gargano, 416 Woodward Ave., Ridgewood, N.Y. 11385

[21] Appl. No.: 863,256

[22] Filed: May 27, 1997

[51] Int. Cl.$^6$ .................................................. B65D 41/00
[52] U.S. Cl. .................... 215/228; 215/230; 215/DIG. 3; 220/212; 141/381
[58] Field of Search .................... 215/228, 230, 215/DIG. 3; 220/212; 141/381

[56] References Cited

U.S. PATENT DOCUMENTS

| | | | |
|---|---|---|---|
| 58,153 | 9/1866 | Timmons | 141/381 X |
| 202,268 | 4/1878 | Keller | 141/381 X |
| 525,753 | 9/1894 | Turner | 141/381 X |
| 653,262 | 7/1900 | Rodiger | 141/381 X |
| 1,780,875 | 11/1930 | Gordon . | |
| 1,869,712 | 8/1932 | Palmer | 141/381 X |
| 1,986,741 | 1/1935 | Moser | 141/381 X |
| 2,061,685 | 11/1936 | Wheaton . | |
| 2,108,692 | 2/1938 | Pieck | 141/381 X |
| 2,559,168 | 7/1951 | Numbers . | |
| 2,762,526 | 9/1956 | Gilmour . | |
| 4,269,319 | 5/1981 | Rubens | 215/228 |
| 4,566,508 | 1/1986 | Bowyer . | |
| 4,741,459 | 5/1988 | Silvenis et al. . | |
| 4,773,560 | 9/1988 | Kittscher . | |
| 5,060,827 | 10/1991 | Segati | 222/109 |
| 5,566,509 | 10/1996 | Szajna . | |
| 5,662,249 | 9/1997 | Grosse | 222/461 |

*Primary Examiner*—Stephen K. Cronin
*Attorney, Agent, or Firm*—Michael I. Kroll

[57] ABSTRACT

A combination bottle cap and pre-measured medicine dispenser for a medicine bottle having a threaded neck and a body a substance therein. The combination bottle cap and pre-measured medicine dispenser includes a cap for detachably sealing the threaded neck of the medicine bottle from leakage of the substance and a measuring vial interconnected with the cap for measuring a predetermined amount of substance poured out of the threaded neck from the body of the medicine bottle after the cap is removed from the threaded neck of the medicine bottle so that the substance can be dispensed therefrom. The cap includes a cone shaped cover wall having a recess extending therethrough and a skirt depending from the cone shaped cover wall for engaging and sealing the threaded neck. A stopper including a flat base for supporting the combination bottle cap and pre-measured medicine dispenser is used to close the recess extending through the cone shaped cover wall. A base of the measuring vial is defined by the cone shaped cover wall and stopper.

4 Claims, 6 Drawing Sheets

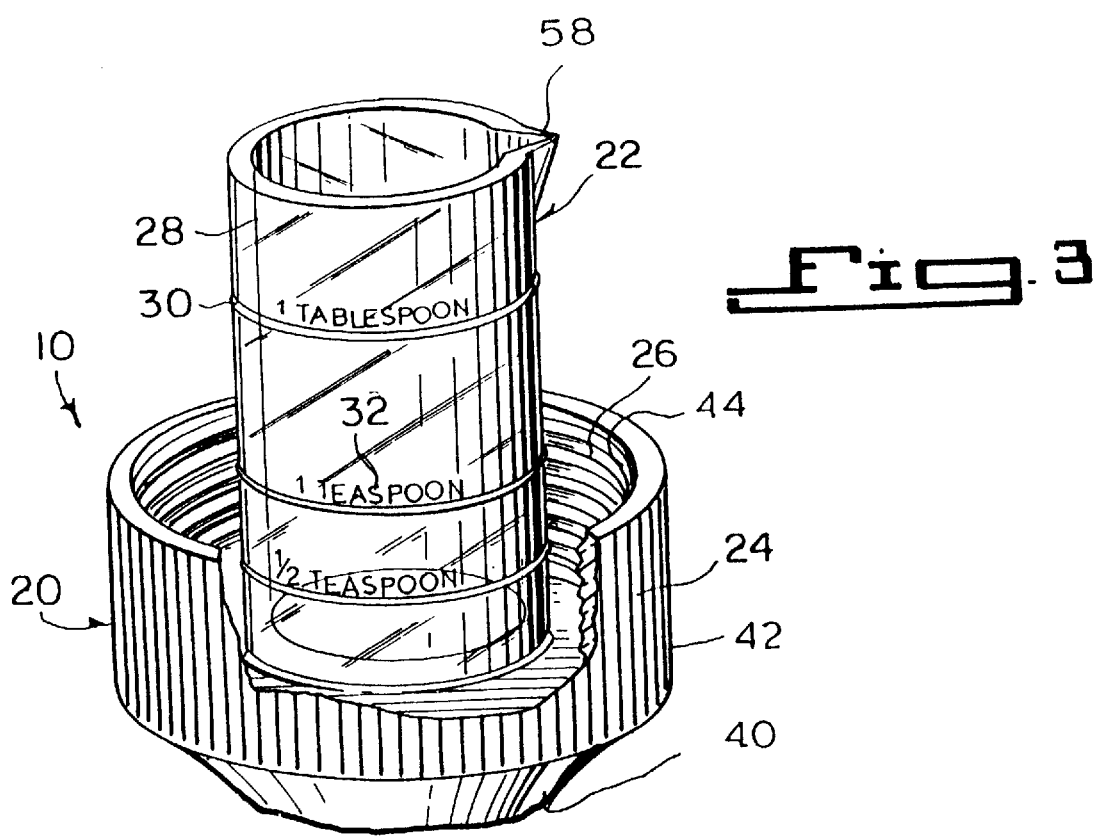

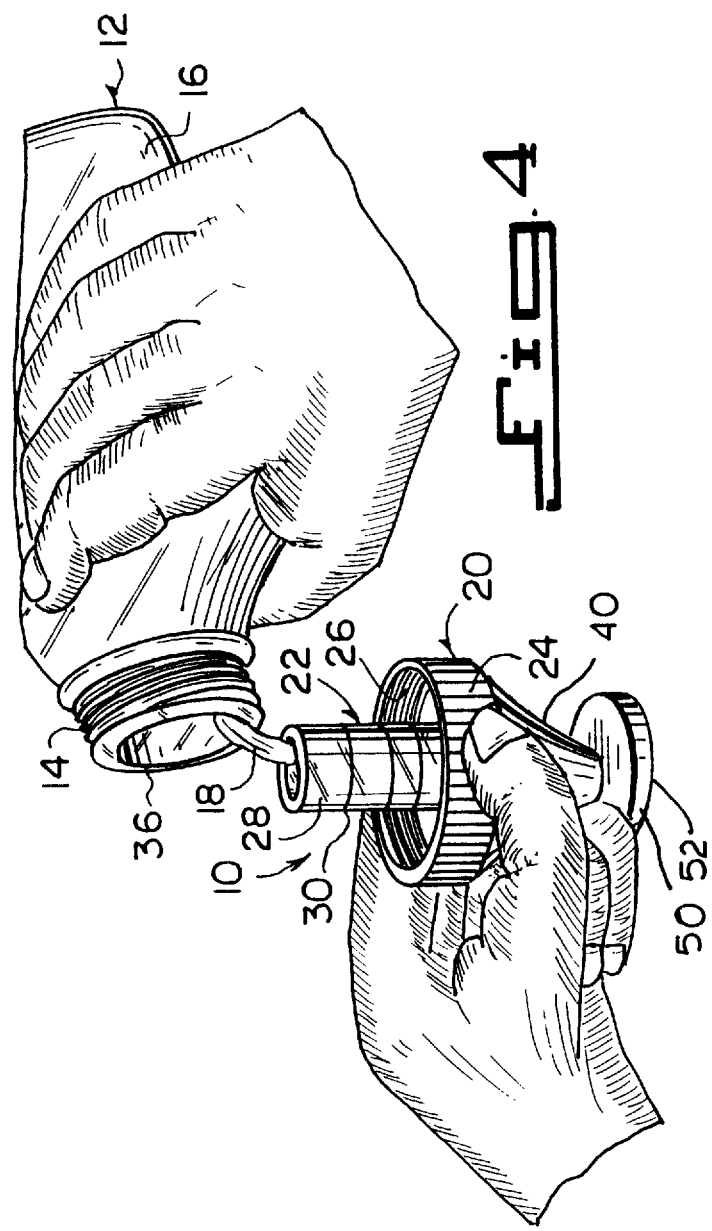

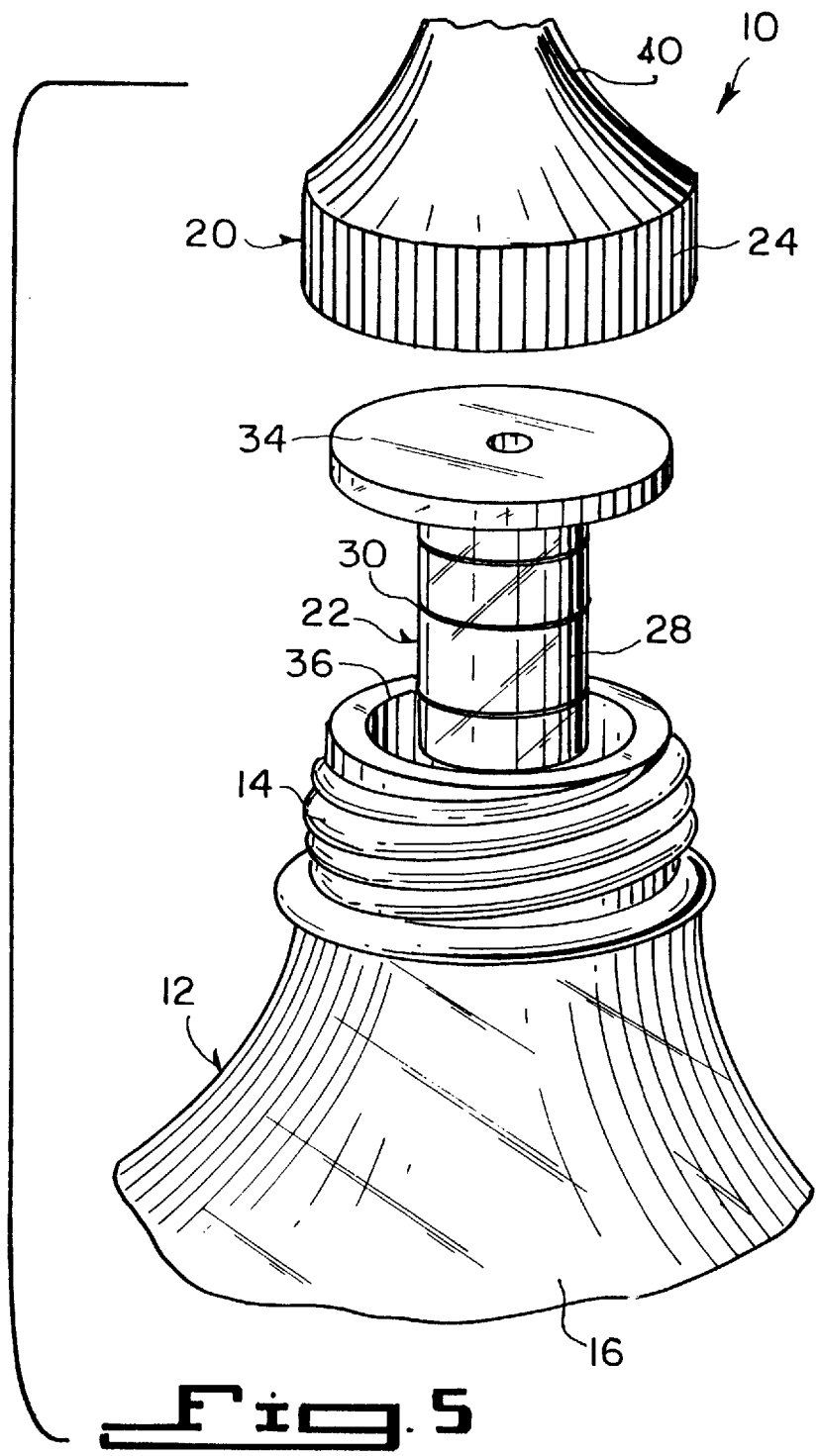

COMBINATION BOTTLE CAP AND PRE-MEASURED MEDICINE DISPENSER

BACKGROUND OF THE INVENTION

1. Field of the Invention

The instant invention relates generally to container closures and, more specifically, to a combination closure cap and pre-measured medicine dispenser containing a measuring vial for measuring an amount of substance dispensed from a bottle.

2. Description of the Prior Art

Numerous container closures have been provided in prior art that are adapted to seal container to prevent spillage and leaks therefrom. For example, U.S. Pat. No. 1,780,875; 2,061,685; 2,559,168; 4,269,319; 4,566,508; 4,566,509; 4,741,459 and 4,773,560 are all illustrative of such prior art. While these units may be suitable for the particular purpose to which they address, they would not be as suitable for the purposes of the present invention as heretofore described.

U.S. Pat. No. 1,780,875

Inventor: Edward L. Gordon

Issued: Nov. 4, 1930

This invention relates to measuring devices and its general object is to provide a combined bottle cap and measuring glass associated in a manner for closing a bottle when applied thereto, and when removed therefrom, the cap may be used to cooperate with the glass to aid in measuring quantities of the contents of the bottle taken therefrom.

U.S. Pat. No. 2,061,685

Inventor: Jack M. Wheaton

Issued: Nov. 24, 1936

This invention relates to improvements in closures for bottles and jars and particularly to that type of a phenolic condensation compound or synthetic resin and including a threaded attaching flange designed for holding engagement with exterior threads or lugs on the container.

U.S. Pat. No. 2,559,168

Inventor: William Numbers

Issued: Jul. 3, 1951

This invention relates to measuring devices and more particularly to measuring devices for use within any container whereby a given or predetermined quantity of liquid, powder or granular solid may be readily obtainable therefrom.

U.S. Pat. No. 4,269,319

Inventor: George J. Rubens

Issued: May 26,1981

A closure cap is provided for a fluid container which when removed from the container and inverted will enable the measuring and dispensing of a selected amount of the fluid from the container, the closure cap capable of then being re-installed on the fluid container for stowage.

U.S. Pat. No. 4,566,508

Inventor: Edward E. Bowyer

Issued: Jan. 28, 1986

A one-piece plastic cylindrical closure for a container that is useful as a measuring cup. The closure has an integral skirt member projecting into the neck of the container which functions as a self-draining member to return residual liquid remaining in the closure to the container and to prevent this liquid from reaching the threaded exterior neck portion of the container.

U.S. Pat. No. 4,566,509

Inventor: John L. Szajna

Issued: Jan. 28, 1986

This relates to a closure unit which is of a two-piece construction including a measuring cup and a ring member. The ring member includes an annular flange and a skirt having formed thereon locking elements such as threads for engaging the neck finish of a container. The measuring cup is provided mid-height with a flange which is clamped against an end sealing surface of a container by the annular flange of the ring member. The measuring cup is formed of a resilient plastic material so that the flange of the measuring cup has a gasket-like characteristic and can form a seal with the end sealing surface of an associated container. The measuring cup may be fixed relative to the ring member or may be axially movable relative thereto so that in condition of use an open end of the measuring cup will project beyond the skirt of the ring member to permit pouring from the measuring cup. Because the open end of the measuring cup is positioned within the container after use, any residue on the measuring cup drains back into the container.

U.S. Pat. No. 4,741,459

Inventor: Scott A. Silvenis et al.

Issued: May 3, 1988

A dispensing apparatus is disclosed having a hollow wall member closed at one end with a dispensing opening at the other end. A ledge is mounted within the hollow having an aperture therethrough to permit precise pouring through the aperture but with the opening otherwise permitting dispensing of large amounts. Indicia is provided within the hollow to measure a predetermined amount of material, particularly the amount required for a wash load within an automatic washing machine. The dispensing apparatus additionally operates as a closure for a container, preferably of a laundry product and has a skirt for matingly engaging a container opening and closing the same.

U.S. Pat. No. 4,773,560

Inventor: Peter Kittscher

Issued: Sep. 27,1988

A measuring cup closure for a container opening having a screw thread formed on its outside surface. The closure has a spout part which is placeable in the container opening, a pouring spout, and an outer ring formed integrally around the base of the spout part. The outer ring is adapted for surrounding the rim of the container opening from the inside to the outside of the container.

The closure includes a measuring cup which is adapted to be screwed onto the container opening over the spout part wherein the aforementioned outer ring of the spout part has a screw thread for screwing the measuring cup thereto. The measuring cup is integrally formed with an encircling ring having an internal screw thread corresponding to the screw thread of the outer ring of the spout part and the screw thread of the container opening.

SUMMARY OF THE INVENTION

The present invention is concerned with closure caps and, more specifically, to a combination closure cap and pre-measured medicine dispenser containing a measuring vial for measuring an amount of substance dispensed from a bottle.

A primary object of the present invention is to provide a combination bottle cap and pre-measured medicine dispenser that will overcome the shortcomings of the prior art devices.

Another object is to provide a combination bottle cap and pre-measured medicine dispenser in which a closure and measuring vial are combined so that the neck of a medicine bottle can be detachably sealed and the medicine can be poured out into the vial to be measured and then dispensed therefrom.

A further object is to provide a combination bottle cap and pre-measured medicine dispenser that is simple and easy to use.

A still further object is to provide a combination bottle cap and pre-measured medicine dispenser that is economical in cost to manufacture.

A yet further object of the present invention is to provide a combination bottle cap and pre-measured medicine dispenser that prevents spillage.

A still further object of the present invention is to provide a combination bottle cap and pre-measured medicine dispenser that prevents contamination of the medicine caused by drinking from the measuring vial.

An additional object is to provide a combination bottle cap and pre-measured medicine dispenser in which the closure and measuring vial can be formed from two interconnecting pieces for engagement with the neck of the medicine bottle.

An even further object is to provide a combination bottle cap and pre-measured medicine dispenser including a measuring vial which is able to stand upright on a flat surface.

A combination bottle cap and pre-measured medicine dispenser for a medicine bottle having a threaded neck and a body a substance therein is disclosed by the present invention. The combination bottle cap and pre-measured medicine dispenser includes a cap for detachably sealing the threaded neck of the medicine bottle from leakage of the substance and a measuring vial interconnected with the cap for measuring a predetermined amount of substance poured out of the threaded neck from the body of the medicine bottle after the cap is removed from the threaded neck of the medicine bottle so that the substance can be dispensed therefrom. The cap includes a cone shaped cover wall having a recess extending therethrough and a skirt depending from the cone shaped cover wall for engaging and sealing the threaded neck. A stopper including a flat base for supporting the combination bottle cap and pre-measured medicine dispenser is used to close the recess extending through the cone shaped cover wall. A base of the measuring vial is defined by the cone shaped cover wall and stopper.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 3 is an inverted perspective view of a first embodiment of the measuring vial with parts broken away;

FIG. 4 is an inverted perspective view of the first embodiment of the invention showing liquid medicine from the bottle being poured into it to be measured so as to be dispensed therefrom;

FIG. 5 is a perspective view of a second embodiment of the invention exploded away from a medicine bottle which is broken away;

LIST OF REFERENCE NUMBERS

Figure 1:
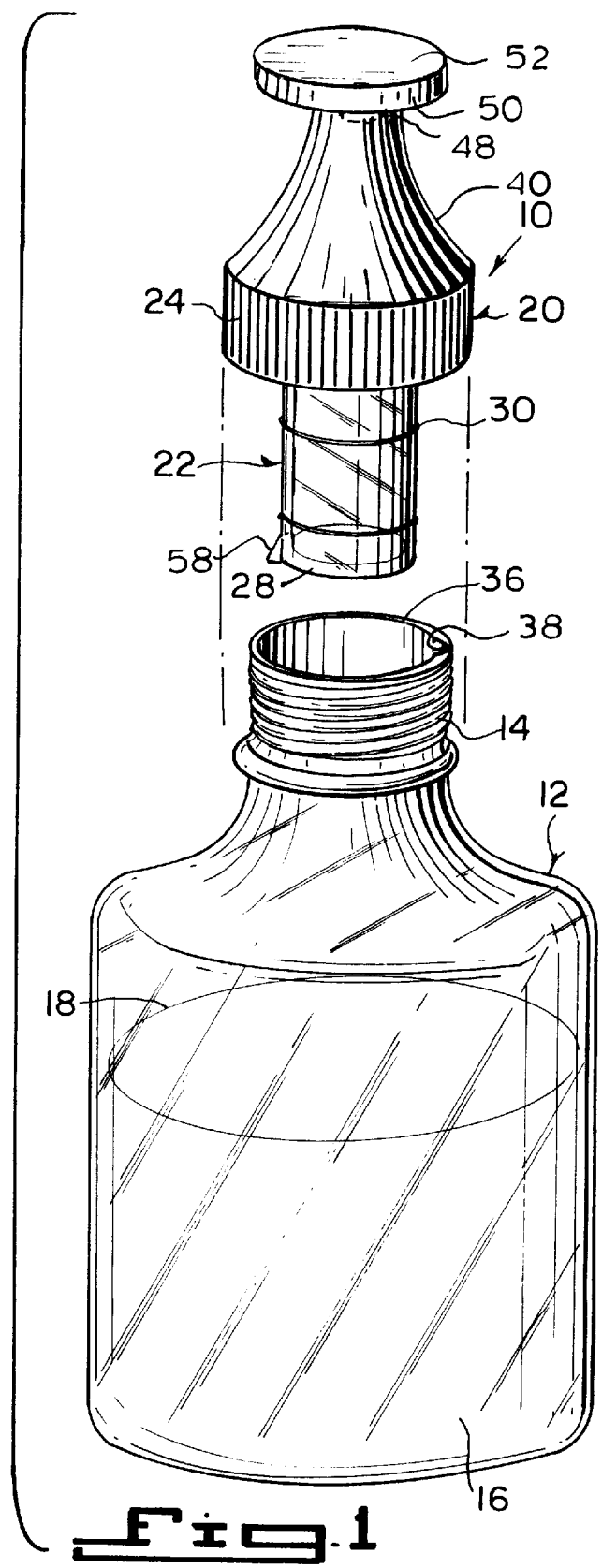
FIG. 1 is a perspective view of a first embodiment of the invention exploded away from a medicine bottle.
Figure 2:
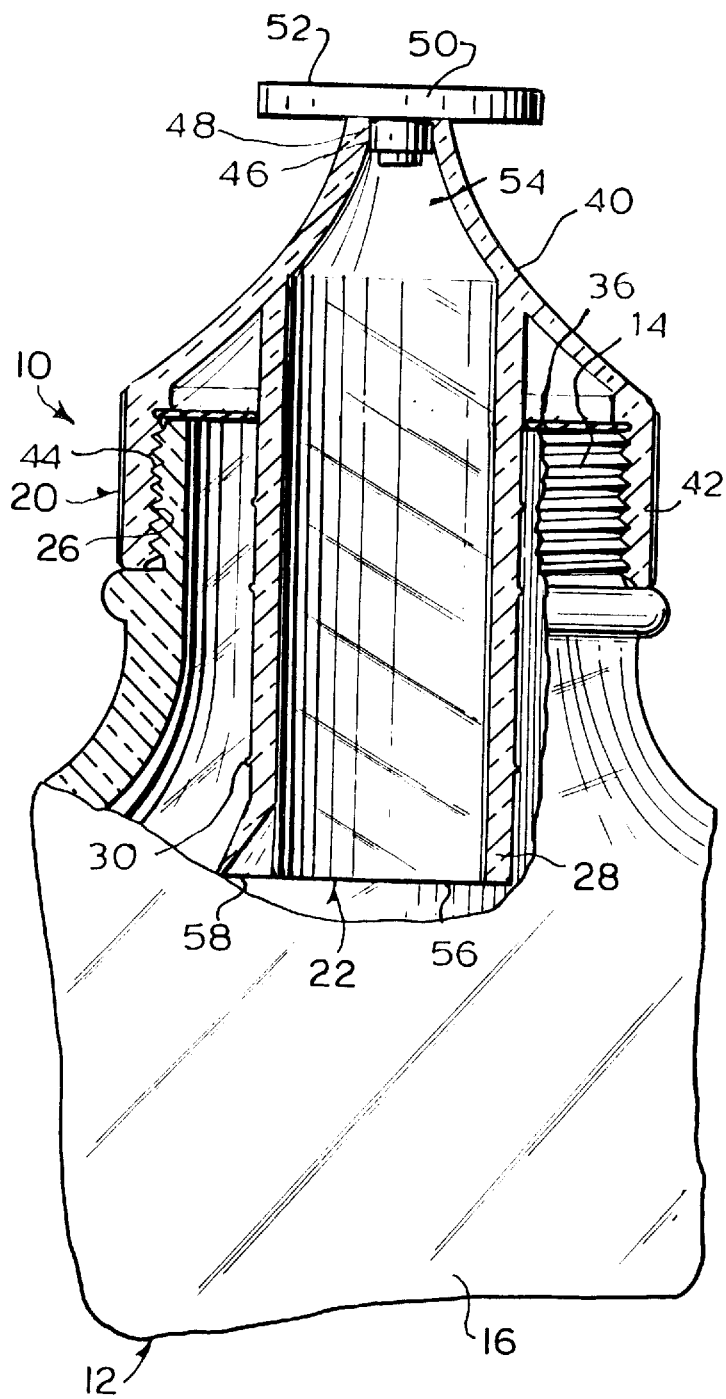
FIG. 2 is an elevational view broken away and partly in section of the first embodiment of the invention attached to the neck of the medicine bottle.

Turning now descriptively to the drawings, in which similar reference characters denote similar elements throughout the several views, the figures illustrate a combination bottle cap and pre-measured dispenser of the present invention. With regard to the reference numerals used, the following is used throughout the various drawing figures.

10 combination bottle cap and pre-measured medicine dispenser
12 medicine bottle
14 threaded neck of medicine bottle
16 body of medicine bottle
18 substance within medicine bottle
20 cap
22 measuring vial
24 twist-off closure
26 internal threads within twist-off closure twist-off closure
28 transparent vial
30 fill line
32 indicia
34 enlarged base on transparent vial
36 mouth of threaded neck on medicine bottle
38 spout on threaded neck on medicine bottle
40 cone shaped cover wall
42 depending skirt
44 internal thread on skirt 46 recess
48 top side of cone shaped cover wall
50 stopper
52 flat surface/stand on stopper
56 top of vial
58 spout on vial
60 nubs on skirt

DETAILED DESCRIPTION OF THE PREFERRED EMBODIMENTS

Turning now descriptively to the drawings, in which similar reference characters denote similar elements throughout the several views, the figures illustrate a combination bottle cap and pre-measured medicine dispenser for use with a bottle of medicine. The combination bottle cap and pre-measured medicine dispenser are indicated generally by the numeral 10.

The combination bottle cap and pre-measured medicine dispenser are used in combination with a medicine bottle 12. The medicine bottle 12 has a threaded neck 14 and a body 16 for storing a substance such as liquid medicine 18 therein. The threaded neck 14 is positioned atop the body 16 providing an opening for the substance 18 contained therein to be dispensed therethrough. The neck 14 of the medicine bottle 12 may also include a detent cut therein to form a spout 38. The spout 38 will help to prevent spillage or dripping of the substance 18 within the bottle 12 during dispensing.

The combination cap and pre-measured medicine dispenser 10 consists of a first structure or cap section 24 for detachably sealing the threaded neck 14 of the medicine bottle 12 preventing leakage of the substance 18 within the bottle 12. A second structure 22 is interconnected to the first structure 24 for measuring a predetermined amount of the substance 18 poured out from the body 16 of the bottle 12 through the threaded neck 14 after removing the first structure 20 from the threaded neck 14 of the bottle 12 (see FIG. 4).

The first structure 24 is a twist-off closure defined by a cone shaped cover wall 40 and a side wall or skirt 42 depending from the cover wall 40. The skirt 42 includes an inner surface 44 having an internal thread 26 which spirals around an inner surface 42 thereof for engaging the threaded neck 14 of the bottle 12.

The cone shaped cover wall 40 includes a recess 46 extending through a side 48 opposite the depending skirt 42. A stopper 50 is removably positioned to seal the recess 46 and includes a flat surface 52 on which the combination cap and pre-measured medicine dispenser 20 is able to balance on a surface when in an inverted position. When inverted, the stopper 50 may be removed allowing the substance within the second structure 22 to be dispensed through the recess 46 and into a receptacle placed thereunder. This provides for dispensing of the substance without any contamination due to the mouth of a user touching the vial and then replacing the vial back into the bottle 12 for contact with the remaining substance 18 therein.

Alternatively, any type of child-proof securing device may be used to secure the combination cap and pre-measured medicine dispenser 20 to the medicine bottle 12 in place of the threaded engagement described above. A seal may also be positioned between the thread 26 spiraling around the inner surface 44 of the skirt 42 and the cone shaped cover 40 providing a means for adequately sealing the combination cap and pre-measured medicine dispenser 10 to the bottle 12 and the substance 18 within the bottle 12.

The seal may be made of rubber, polyurethane or any other flexible material which would provide a secure seal between the combination cap and pre-measured medicine dispenser 20 and bottle 12 and prevent the substance 18 within the bottle 12 from leaking therethrough.

The second structure 22 is a transparent vial 28. The transparent vial 28 includes a first end 54 which terminates at the recess 46 and stopper 50 and a second insertion end 56 through which the substance 18 within the bottle 12 is placed in the transparent vial 28. The circumference of the vial 28 and insertion end 56 are of a size less than the circumference of the neck 14 providing easy insertion of the vial 28 into the neck 16 when the depending skirt 42 is engaging the threaded neck 14 to seal the bottle 12. The vial 28 may also include a spout 58 for preventing spillage of the substance 18 when dispensing a substance measured therein through the insertion end 56. Fill lines 30 may also be positioned on an outer side of the vial 28 to indicate the predetermined amount of substance 18 needed to be poured out of the threaded neck 14 from the body 16 of the medicine bottle 12. Each fill line 30 can have indicia 32 thereabove or below to indicate liquid measurements within the vial 28 such as ½ teaspoon, 1 teaspoon and 1 tablespoon or any other liquid measurement, as shown in FIG. 3.

As shown in FIGS. 1 through 4, a first embodiment of the invention illustrates the closure 24 and the vial 28 formed as one integral unit. Thus, when the closure 24 is threaded onto the threaded neck 14 of the medicine bottle 12 the vial 28 will extend downwardly into the neck 14.

Figure 7:
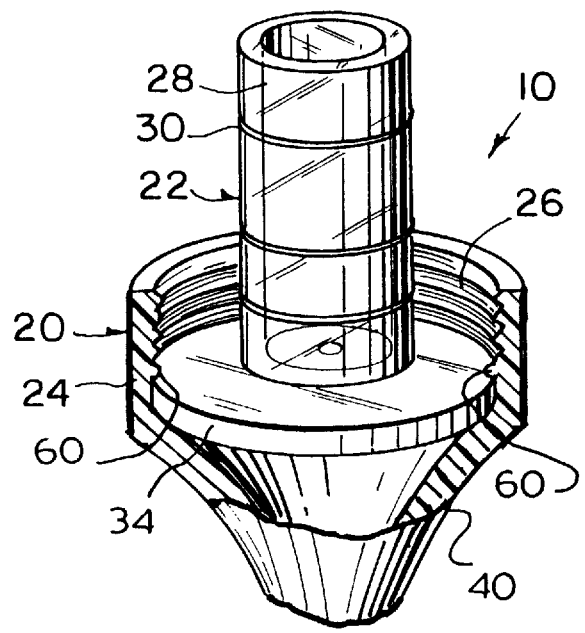
FIG. 7 is an inverted elevational view in partial cross-section of the closure and measuring vial.
Figure 6:
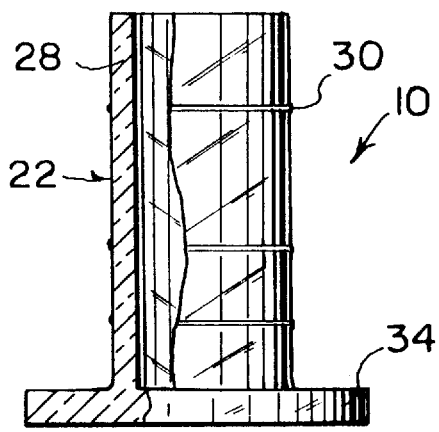
FIG. 6 is an inverted elevational view with parts broken away and in section showing the measuring vial within the closure.

FIGS. 5 through 7 illustrate a second embodiment in which the closure 24 and the vial 28 are formed as two separate units. In this embodiment, the closure 24 includes a plurality of nubs 60 extending from the depending skirt 42 and positioned between the spiraling thread 26 and the cone shaped cover 40. The plurality of nubs 60 are most clearly seen in FIG. 7. The vial 28 includes an enlarged circular base 34 sized to fit over the mouth 36 of the threaded neck 14 and able to be secured within the cap 24 below the plurality of nubs 60 allowing the vial 28 to extend downwardly into the neck 14 when the closure 24 is threaded onto and engaging the threaded neck 14 of the bottle 12. The vial 28 also includes a second end having a circumference equal to that of the first end 56 which opens into the internal side of the cone shaped cover 40. The internal side of the cone shaped cover 40 and the stopper 50, thus, form a base of the vial 28.

In operation, the medicine bottle 12 is filled with a substance 18 and the cap 24 is secured thereon with the vial 28 extending downwardly into the medicine bottle 12. When it is desired to dispense the substance 18 from the medicine bottle 12, the cap 24 is unscrewed from the bottle 12 and is inverted, placing the cap 24 of the combination cap and pre-measured medicine dispenser 20 standing on the flat surface 52 of the stopper 50. The substance 18 within the bottle 12 is then poured over the detent 38 and into the vial 28. The substance 18 is dispensed until the level of substance 18 in the vial 28 reaches a desired one of the fill lines 30. The liquid medicine 18 is now ready to be dispensed therefrom.

In order to dispense the substance 18 from the vial 28, the vial 28 may be tilted and the substance poured over the spout 58 formed therein either into the takers mouth, a glass or the like. Alternatively, the vial 28 may be held over the taker's mouth, a glass or the like and the stopper 50 may be removed allowing the substance to flow through the recess 46 to its destination located therebelow. Thus, the vial need never contact the mouth of the ingester of the substance. Once the substance is dispensed, the combination cap and pre-measured medicine dispenser 20 may then be replaced atop the bottle 12 with the vial extending downwardly into the body 16 of the bottle 12. The combination cap and pre-measured medicine dispenser 20 may then be secured on the bottle 12 by turning to engage the thread 26 on the inner surface 44 of the skirt 42 with the threaded neck 14.

The present invention is thus able to provide a combination bottle cap and pre-measured medicine dispenser that will overcome the shortcomings of the prior art devices by combining a closure and measuring vial so that the neck of a medicine bottle can be detachably sealed and the medicine can be poured out into the vial to be measured and then dispensed therefrom. The combination bottle cap and pre-measured medicine dispenser includes a spout for preventing spillage and a cone shaped recess and stopper combination for dispensing medication from the vial and thereby prevent contamination of the medicine caused by drinking from the measuring vial. The combination bottle cap and pre-measured medicine dispenser may also be formed from two interconnecting pieces for engagement with the neck of the medicine bottle. Furthermore, the combination bottle cap and pre-measured medicine dispenser that is simple and easy to use and economical in cost to manufacture.

An even further object is to provide a combination bottle cap and pre-measured medicine dispenser including a measuring vial which is able to stand upright on a flat surface.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A combination bottle cap and pre-measured dispenser for a bottle having a threaded neck and a body for holding a substance therein, comprising:

a) means for detachably sealing the threaded neck of the bottle from leakage of the substance including a cone shaped cover wall having a recess extending therethrough and a skirt depending from said cone shaped cover wall for engaging and sealing the threaded neck, said detachably sealing means being a twist-off closure and said skirt includes an inner side and a thread spiraling around the inner side for engaging and sealing the threaded neck of the bottle;

b) stopper means for closing the recess extending through said cone shaped cover wall including a flat base for supporting said combination bottle cap and pre-measured dispenser in an inverted position; and c) means, interconnected to said detachably sealing means, for measuring a predetermined amount of substance poured out of the threaded neck from the body of the bottle after said detachably sealing means is removed from the threaded neck of the bottle so that the substance can be dispensed therefrom, said measuring means including a base defined by said cone shaped cover wall and stopper, said measuring means being a transparent vial having at least one fill line thereon to indicate the predetermined amount of substance needed to be poured through the threaded neck from the body of the bottle and wherein said sealing means and said measuring means are formed as two separate units; said skirt further includes a plurality of nubs extending around the inner side thereof between said thread and connection to said cone shaped cover wall; and said measuring means further includes an enlarged base retained within said sealing means by said plurality of nubs, said enlarged base being sized to fit over the threaded neck allowing the measuring means to extend downwardly into the threaded neck when said sealing means is threaded onto the threaded neck of the bottle.

2. A combination bottle cap and pre-measured dispenser as recited in claim 1, wherein said sealing means and said measuring means are formed as one integral unit so that when said sealing means is threaded onto the threaded neck of the bottle said measuring means will extend downwardly into the threaded neck.

3. A combination bottle cap and pre-measured dispenser as recited in claim 1, wherein said measuring means further includes an insertion end having a circumference smaller than a circumference of the threaded neck and a spout extending from said insertion end for aiding in pouring a substance from said measuring means.

4. A combination bottle cap and pre-measured dispenser as recited in claim 3, wherein said measuring means further includes a dispensing end, said dispensing end and insertion end each having a circumference smaller than a circumference of the threaded neck, wherein said dispensing end provides a passage to said stopper for a substance poured into said measuring means.

* * * * *